United States Patent [19]

Koch et al.

[11] 4,117,073

[45] Sep. 26, 1978

[54] PROCESS FOR THE PRODUCTION OF PREPLASTICIZED MATERIALS

[75] Inventors: Heinrich Koch, Siegburg; Josef Lehnen, Bad Soden bei Salmünster, both of Germany

[73] Assignees: Heinrich Koch, Auf der Hohl; Bayer Aktiengesellschaft, Leverkusen, both of Germany

[21] Appl. No.: 622,237

[22] Filed: Oct. 14, 1975

[30] Foreign Application Priority Data

Oct. 19, 1974 [DE] Fed. Rep. of Germany ....... 2449489

[51] Int. Cl.² .............................................. B29B 5/02
[52] U.S. Cl. ..................................... 264/349; 366/69; 264/102; 264/176 R; 264/329; 425/208
[58] Field of Search ............... 264/349, 329, 211, 101, 264/102, 176 R, 175, 201; 425/208, 205–207, 209–210; 259/8, 9, 23, 24, 191, 42, 43

[56] References Cited

U.S. PATENT DOCUMENTS

| | | | |
|---|---|---|---|
| 2,744,287 | 5/1956 | Parshall et al. | 425/208 |
| 2,894,280 | 7/1959 | Juve | 264/349 |
| 3,036,335 | 5/1962 | Heston et al. | 264/176 R |
| 3,522,627 | 8/1970 | Vanzo | 425/208 |
| 3,535,737 | 10/1970 | Hendry | 259/191 |
| 3,559,240 | 2/1971 | Kosinsky et al. | 425/208 |
| 3,633,494 | 1/1972 | Schippers et al. | 425/208 |

Primary Examiner—Jeffery R. Thurlow
Attorney, Agent, or Firm—Connolly and Hutz

[57] ABSTRACT

A process and apparatus for the production of materials preplasticized to their final density from high molecular weight powder-form completed mixtures, which are directly used as starting product for subsequent final processing, wherein the powder mixture is conveyed along a helical compression screw and subjected to accelerated compression and, at the same time, preplasticized at a temperature which corresponds to the material temperature required for final processing.

4 Claims, 4 Drawing Figures

PROCESS FOR THE PRODUCTION OF PREPLASTICIZED MATERIALS

This invention relates to a process and apparatus for the production of materials preplasticised to final density from high molecular weight powder-form completed mixtures, more especially mixtures containing rubber powder as the base material, which are directly used as starting materials for subsequent final processing.

Processes of the kind referred to above and apparatus for carrying them out are already known.

In one known process, the high molecular weight powder-form completed mixture is introduced onto mixing rolls and brought to its final density between the rolls. One disadvantage of this known process is the low throughput per unit of time, because the two rolls have to be adjusted to a very narrow interval from one another on account of the powder form of the material. Despite intensive cooling of the rolls, the minimal gap width causes heavy shearing of the powder-form completed mixture which in turn results in excessively high temperatures of the compressed material.

This necessitates the provision of a cooling zone through which the material brought to its final density has to pass before final processing. Apart from the additional process stage necessitated by cooling, this known process involves considerable outlay on apparatus and has a high energy requirement.

In another known process, the powder-form completed mixture is condensed in an internal mixer. Although it is possible in this process to obtain a much higher throughput per unit of time by virtue of the mixing chamber/double rotor system with its greater internal volume, the material is nevertheless subjected to the same shearing effect and, hence, is exposed to the same excessively high temperature on reaching its final density, with the result that cooling is also necessary in this process. Apart from this additional process stage of cooling, the material issuing from the internal mixer in lump form has to be processed on subsequent rolls, for example into sheet or strip form, before final processing.

This known process also involves much heavier outlay on apparatus and has a much higher energy requirement than the other known process described above.

Accordingly, the object of the present invention is to provide a process and an apparatus, in which the high molecular weight powder-form completed mixture is continuously condensed to its final density, whilst at the same time, the gaseous constituents released are removed, with minimal outlay on apparatus and a minimal energy requirement.

According to the invention, there is provided a process for the production of materials preplasticised to their final density from high molecular weight powder-form completed mixtures, more especially mixtures containing rubber powder as the base material, which are directly used as starting product for subsequent final processing, wherein the powder mixture is conveyed along a helical compression screw with a constant and/or decreasing helix diameter and is subjected to accelerated compression through the application of additional shear forces in the outer zone of the helixes and, at the same time, the powder mixture is preplasticised at a temperature which corresponds to the material temperature required for final processing, the gaseous constituents present in the powder mixture being continuously taken up by the mixture and/or carried off outwards during compression.

It has been found to be of advantage to compress the powder mixture to its final density in a helical compression zone with a constantly decreasing helix diameter, the conical shell surrounding the helixes forming an angle of from 10° to 60°.

In case of rubber powders of low filler content, the optimum cone angle is from 25° to 40°. In the case of rubber powders of high filler content, the cone angle may exceed 40° on account of the low bulk factor.

In the same way as the angle of the conical shell surrounding the helixes may be varied, preplasticisation may be adapted to meet the requirements of final processing. It has also been found to be of advantage to carry out preplasticisation in a temperature range from room temperature to 100° C.

Since the final prOcessing machines are filled with material preplasticised to its final density at room temperature, for example through cold-fed extruders and cold-fed rubber injection machines, it has also proved to be of particular advantage to carry out preplasticisation at room temperature. However, preplasticisation may of course also be carried out at temperatures above room temperature, for example in cases where it is intended subsequently to introduce the preplasticised material into calendars.

During compression and preplasticisation, the gaseous constituents liberated are carried off outwards whilst entrained constituents are taken up by the mixture. It has been found that, with various powder mixtures, for example those having added lightweight voluminous fillers, not all the gaseous constituents have been removed or taken up by the mixture by the time it has been compressed to its final density and preplasticised. Accordingly, in another embodiment of the process according to the invention, removal of the gaseous constituents from the powder mixture is continued after compression to the final density and preplasticisation.

According to the invention, there is provided an apparatus for carrying out the process described above, wherein stirrer vanes 17 are provided on a support 11 in the form of a shaft which is guided in a housing 4, 5, 6 and which subsequently continues in the form of a screw, the screw consisting of a cylindrical-conical or conical section followed by a cylindrical section, and the housing 4, 5, 6 being provided on its inside, in the vicinity of the cylindrical-conical and/or conical section of the screw, with fillets 18 which extend at an angle to the generatrices of the cylindrical-conical and/or conical section of the housing.

The fact that the housing is provided on its inside, in the vicinity of the cylindrical-conical and/or conical section of the screw, with fillets which extend at an angle to the generatrices of the cylindrical-conical and/or conical section of the housing, ensures that the rotating movement of the powder-form completed mixture is interrupted in layers situated near the wall, so that the flow of the mixture in the axial direction is intensified.

In order to be able to control compression of the powder mixture in dependence upon its compactability, the support is mounted for axial displacement.

Compression, throughput and flow are all influenced by action on the powder mixture from outside before it enters the screw zone. According to the invention, theefore, the stirrer vanes are mounted for displacement perpendicularly of the axis of the support and for rotation about their own axis.

In the case of powder mixtures with relatively high wall adhesion, the stirrer vanes will be arranged nearer the wall by axial displacement. In order to increase throughput, they will be pitched at a greater angle relative to the horizontal.

In one preferred embodiment of the invention, the stirrer vanes may be provided on their outer edges with flexible strippers consisting of a non-ferrous metal.

In order to be able to install and remove the support quickly, the housing of the support is divided up corresponding to the screw zones. This affords the advantage that the various sections of the support housing may be connected to separate heating or cooling systems differing from one another in the intensity of their effect, so that both compression and preplasticisation may be influenced from outside by an additional heating or cooling effect.

In order to promote the heating and cooling effect on the powder mixture of the various systems of the sections of the support housing in the screw zones, the support may be made in the form of a hollow body, a cooling or heating medium flowing through the hollow interior of the support.

It has been found that not all the gaseous constituents have been removed from or taken up by the material after compression to its final density and preplasticisation. In order to be able to remove this residue as well, the housing is provided near the end of the screw with one or more openings to which a vacuum system, for example, may be connected.

The advantages of the process and apparatus according to the invention over the conventional processes and apparatus described earlier on are obvious. By virtue of the continuous compression effect on the high molecular weight powder-form completed mixture until it has reached its final density, there is no need for any intermediate or subsequent process stages which involve additional outlay and require more energy. The preparation of a product for final processing takes place continuously in the shortest possible manner, so that the amount of space and number of personnel required are also considerably reduced in comparison with conventional processes.

An apparatus for carrying out the process according to the invention is described in the following with reference to the accompanying drawings, wherein.

Figure 1:
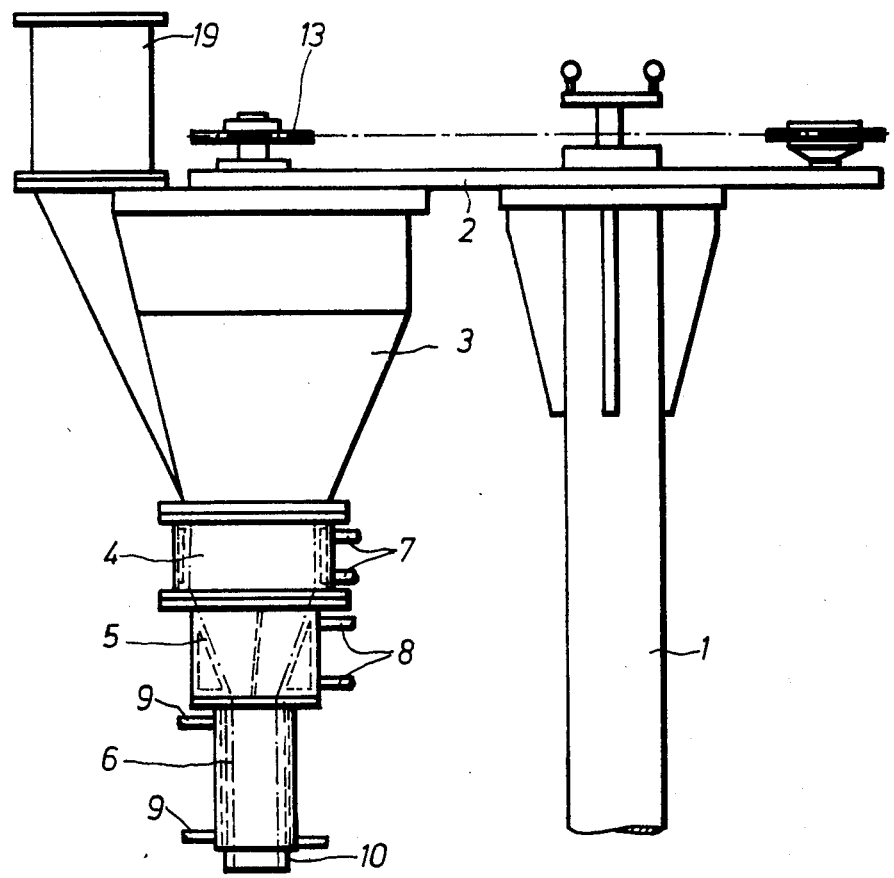
FIG. 1 is a side elevation of an apparatus according to the invention.

The apparatus for carrying out the process according to the invention is suspended from a stand 1 by means of a traverse member 2. The apparatus according to the invention consists of a feed hopper 3 adjoined at its lower end by housing sections 4, 5, 6 corresponding to the screw zones. The housing sections 4, 5, 6 are provided with connections 7, 8, 9 for heating and cooling systems. The housing section 6 is provided at the end of the screw with openings 10 to which an evacuation system (not shown) may be connected.

Figure 2:
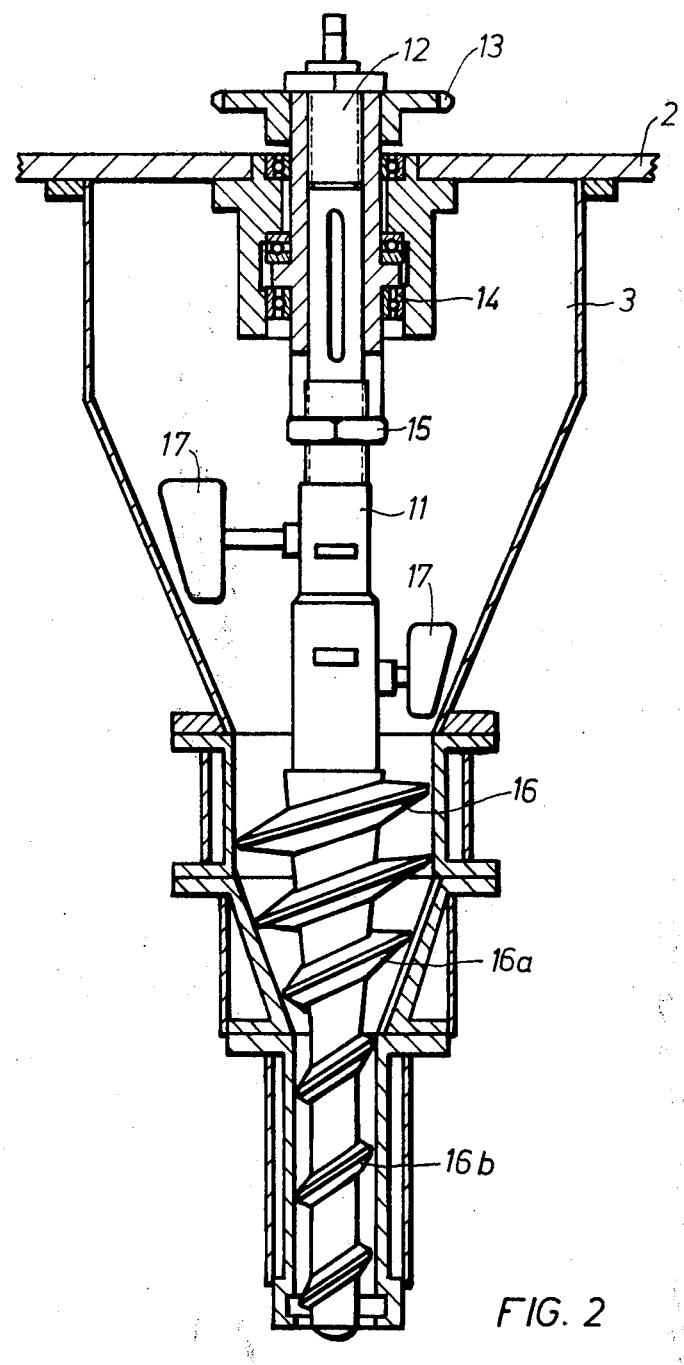
FIG. 2 is a longitudinal section through the apparatus according to the invention.
Figure 3:
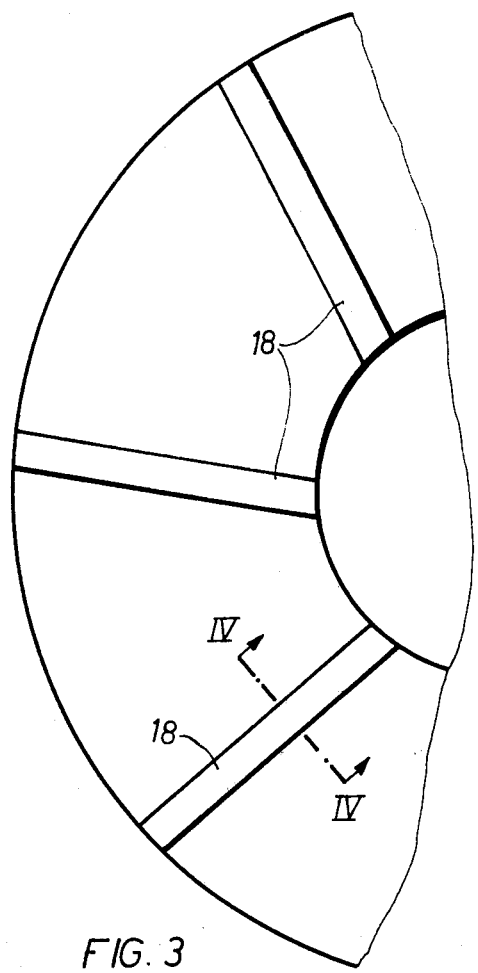
FIG. 3 is a developed projection of part of the conical section of the housing.
Figure 4:
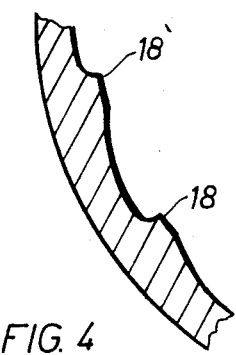
FIG. 4 is a section on the line IV—IV of FIG. 3.

A support 11 is suspended from the traverse member 2. The support 11 is driven at its upper free end 12 by a drive wheel 13. Below the bearing 14, the support 11 is axially displaceable by means of a threaded ring 15. In addition, the support 11 is provided, before the beginning of the screw zone 16, with staggered stirrer blades 17 which are mounted for displacement perpendicularly of the axis of the support and for rotation about their own axis. Below the stirrer blade 17, (see FIG. 2) the support 11 continues in the form of a screw in such a way that a cylindrical-conical section 16, 16a is followed by another cylindrical section 16b. It is also possible to use a purely conical section instead of a cylindrical-conical section 16, 16a. The housing is provided on its inside, in the vicinity of the cylindrical-conical section 16, 16a and/or conical section 16b of the screw, with fillets 18 (see FIGS. 3 and 4) which extend at an angle to the generatrices of the cylindrical-conical section and/or conical section of the housing.

The process according to the invention is carried out as follows in the apparatus illustrated in FIGS. 1 to 4:

The powder mixture flows through a feed opening 19 into the hopper 3 in which the stirrer vanes 17 rotate. Corresponding to their pitch angle, the stirrer vanes deliver the mixture axially into the vicinity of the first screw zone 16. The powder mixture is prevented from adhering to the wall and from building up in the vicinity of the wall by arranging the stirrer vanes near the wall. The stirrer vane system as a whole prevents the material from forming bridges in the feed hopper 3. The axial delivery of the powder mixture continues in the first screw zone in which compression simultaneously begins and in which the gaseous constituents liberated escape upwards through the helical form in which the material piles up. The powder mixture is compressed to substantially its final density and, at the same time, plasticised in the following conical section, the gaseous constituents released during compression now being taken up by the mixture itself.

In the following cylindrical section 16b of the screw, the mixture is compressed to its final density and the gaseous constituents which have still not escaped or been taken up by the mixture are removed. Uniform discharge is obtained by the length of the cylindrical section.

We claim:

1. A process for the production of materials condensed to their final density from high molecular weight powder-form rubber mixtures, wherein the powder mixture is conveyed along a helical compression screw with decreasing helix diameter fitting closely within a conical casing and is thereby subjected to increasing compression through the application of additional shear forces in the outer zone of the helixes whilst at the same time the powder mixture is condensed and plasticized at a suitable temperature, the powder mixture being stirred and supplied to the helical compression screw by rotating pitched blades which prevent the formation of bridges in the supplied powder mixture, the gaseous constituents present in the powder mixture being continuously taken up by the mixture and carried off outwardly during compression.

2. A process as claimed in claim 1, wherein the powder mixture is compressed to its final density in a helical compression zone with a constantly decreasing helix diameter, the conical shell surrounding the helixes forming an angle of from 10° to 60°.

3. A process as claimed in claim 1, wherein preplasticisation takes place at a temperature in the range from room temperature to 100° C.

4. A process as claimed in claim 1, wherein removal of the gaseous constituents from the powder mixture is continued after the material has been compressed to its final density and preplasticised.

* * * * *